US009118808B2

(12) United States Patent
Graff et al.

(10) Patent No.: US 9,118,808 B2
(45) Date of Patent: Aug. 25, 2015

(54) DYNAMIC ALLOCATION OF ENCODERS

(71) Applicant: Pexip AS, Lysaker (NO)

(72) Inventors: Havard Helland Graff, Oslo (NO); Hakon Dahle, Oslo (NO)

(73) Assignee: Pexip AS, Lysaker (NO)

( * ) Notice: Subject to any disclaimer, the term of this patent is extended or adjusted under 35 U.S.C. 154(b) by 0 days.

(21) Appl. No.: 14/192,492

(22) Filed: Mar. 26, 2014

(65) Prior Publication Data

US 2014/0313281 A1  Oct. 23, 2014

(51) Int. Cl.
*H04N 7/15* (2006.01)
*H04L 12/18* (2006.01)
*H04L 29/06* (2006.01)

(52) U.S. Cl.
CPC .............. *H04N 7/152* (2013.01); *H04L 12/185* (2013.01); *H04L 12/1827* (2013.01); *H04L 12/1877* (2013.01); *H04L 65/403* (2013.01); *H04L 65/605* (2013.01); *H04L 65/80* (2013.01)

(58) Field of Classification Search
CPC ......... H04N 7/148; H04N 7/15; H04N 7/152; H04N 19/00
USPC ...................... 348/14.09, 14.08, 14.01, 14.04; 370/260–261
See application file for complete search history.

(56) References Cited

U.S. PATENT DOCUMENTS

| 6,731,605 | B1 | 5/2004 | Deshpande | |
|---|---|---|---|---|
| 2012/0284409 | A1 | 11/2012 | Lee et al. | |
| 2014/0267570 | A1* | 9/2014 | Weber et al. | 348/14.08 |
| 2014/0267572 | A1* | 9/2014 | Bright-Thomas | 348/14.09 |

FOREIGN PATENT DOCUMENTS

| EP | 2227013 A2 | 9/2010 |
|---|---|---|
| WO | 2010138913 A1 | 12/2010 |

OTHER PUBLICATIONS

International-Type Search Report dated Dec. 2, 2013 for National Application Serial No. NO2013/0531, National Filing Date: Apr. 17, 2013 consisting of 3 pages.
Rong Luo, Optimization of Motion Estimation in H264/AVC Encoder for Video Conference Application, Dept. of Electronic Engineering/Tsinghua University/Beijing, 100084, China, BNSDOCIS:<XP_31528893A_1_>, 3 pages.
T. Chattopadhyay et al., Enhancements of H.264 Encoder performance for video conferencing and videophone applications in TMS320C55X, BNSDOCID:<_10937919A_1>, 6 pages.

(Continued)

*Primary Examiner* — Stella L Woo
(74) *Attorney, Agent, or Firm* — Christopher & Weisberg, P.A.

(57) ABSTRACT

A method and a device for providing for sharing encoder resources in an MCU without compromising with image quality and bandwidth adaption is provided. The method and device comprises dynamic allocation of encoders in a multi-party video conference of a number of endpoints, wherein the video conference endpoints are adapted to encode and transmit a media stream comprising the steps of creating a new encoder at a request for a new pad, determining whether a maximum number of encoders is reached, if the maximum number of encoders is not reached, then linking the new pad to the new encoder, if the maximum number of encoders is reached, then linking all existing pads to the new encoder, and releasing all unused encoders.

14 Claims, 4 Drawing Sheets

(56) References Cited

OTHER PUBLICATIONS

Norwegian Search Report, dated Nov. 9, 2013 for Norwegian Patent Application No. 20130531.

Norwegian Office Action, dated Nov. 9, 2013 for Norwegian Patent Application No. 20130531 consisting of 4 pages. English Translation attached, consisting of 5 pages.

Norwegian Search Report, dated Nov. 9, 2013 for Norwegian Patent Application No. 20130531 consisting of 2 pages.

* cited by examiner

US 9,118,808 B2

DYNAMIC ALLOCATION OF ENCODERS

CROSS-REFERENCE TO RELATED APPLICATIONS

This application claims priority to Norwegian Patent Application No. 20130531, filed Apr. 17, 2013, entitled DYNAMIC ALLOCATION OF ENCODERS, the entirety of which is incorporated herein by reference.

STATEMENT REGARDING FEDERALLY SPONSORED RESEARCH OR DEVELOPMENT n/a

FIELD OF THE INVENTION

The present invention relates to a method, computer program and a system providing dynamic allocation of encoders.

BACKGROUND OF THE INVENTION

Transmission of moving pictures in real-time is employed in several applications like e.g. video conferencing, net meetings and video telephony.

Video conferencing systems allow for simultaneous exchange of audio, video and data information among multiple conferencing sites. Systems known as Multipoint Control Units (MCUs) perform switching functions to allow the endpoints of multiple sites to intercommunicate in a conference. An endpoint conventionally refers to a video conference terminal, either a stand-alone terminal equipped with at least a camera, a display, a loudspeaker or a headphone and a processor or a video conferencing software client installed on a general purpose computer with the corresponding capabilities.

The MCU links the sites together by receiving frames of conference signals from the sites, processing the received signals, and retransmitting the processed signals to appropriate sites. The conference signals include audio, video, data and control information. In a switched conference, the video signal from one of the endpoints, typically that of the loudest speaker, is broadcasted to each of the participants. When the different video streams have been mixed together into one single video stream, the composed video stream is transmitted to the different parties of the video conference, where each transmitted video stream preferably follows a set of schemes indicating who will receive which video stream. In general, the different users prefer to receive different video streams. The continuous presence or composite image is a combined picture that may include live video streams, still images, menus or other visual images from participants in the conference. The combined picture may e.g. be composed by several equally sized pictures, or one main picture in addition to one or more smaller pictures in inset windows, commonly referred to as Picture-in-Picture (PIP). PIPs require typically a much lower resolution than the main picture due to the size difference within the screen.

Video MCUs based on a transcoding architecture will use one dedicated encoder per connected participant (video terminal). The advantage is that each participant can have a personalized view of the conference, but more important from a network resilience point of view is the fact that this ensures that if one participant is connecting over a poor network then this does not affect the received video quality experienced by the other participants.

Existing video MCUs that use a shared encoder approach suffer from quality problems if one of the endpoints connected to the shared encoder has a bad network. The particular endpoint may ask the MCU to (1) continuously send complete inter frames (I-frames) in order to "clean up" any received video errors, or (2) ask the MCU to reduce its transmission rate and send a lower resolution or lower frame rate video stream in order to reduce the bandwidth used in the hope of reducing the number of packets lost. Since the encoder in the MCU is shared among several endpoints, then clearly these two issues will degrade the experience for these other endpoints. Thus, there is a need for a method for sharing encoder resources in an MCU without compromising with image quality and bandwidth adaption.

SUMMARY OF THE INVENTION

An object of embodiments herein is to overcome or at least alleviate the above mentioned disadvantage. This object and other objects are achieved by the independent claims enclosed herewith. According to embodiments herein, a method for dynamic allocation of encoders in a multi-party video conference of a number of endpoints is provided. The video conference endpoints are adapted to encode and transmit a media stream comprising at least video data. The method comprises requesting for a new pad, creating a new encoder at the request for a new pad and determining whether a maximum number of encoders is reached. If the maximum number of encoders is not reached, linking the new pad to the new encoder, if the maximum number of encoders is reached, linking all existing pads to the new encoder, and releasing all unused encoders.

In other methods herein, monitoring for Packet Loss Indications is further comprised. If a PLI is received within a predefined time period since last received PLI, requesting for a new pad.

In other methods herein, requesting for a new pad when a new endpoint is entering the video conference is comprised.

In other methods herein, a pad is a virtual entity within a transcoding entity on a backplane between switching nodes.

In other methods herein, a pad is a virtual entity within a Virtual Endpoint (VE) sharing encoder resources on a Multipoint Control Unit (MCU) between a number endpoints.

In other embodiments herein, a system providing dynamic allocation of encoders in a multi-party video conference of a number of endpoints is provided. The video conference endpoints are adapted to encode and transmit a media stream comprising at least video data. The system is adapted to request for a new pad, create a new encoder at said request for a new pad and determine whether a maximum number of encoders is reached. If the maximum number of encoders is not reached, the system is adapted to link the new pad to the new encoder. If the maximum number of encoders is reached, the system is adapted to link all existing pads to the new encoder. The system is adapted to release all unused encoders.

In other embodiments of a system, a pad is a virtual entity within a transcoding entity on a backplane between switching nodes.

In still other embodiments of a system, a pad is a virtual entity within a Virtual Endpoint (VE) sharing encoder resources on a Multipoint Control Unit (MCU) between a number endpoints.

In other embodiments, a computer program product for dynamic allocation of encoders in a multi-party video conference of a number of endpoints is provided. The video conference endpoints are adapted to encode and transmit a media stream comprising at least video data. The computer program product comprises a computer-readable storage medium having computer-readable program code embodied in the medium. The computer-readable program code comprises computer readable program code configured to execute all 30 the steps of methods described herein.

DETAILED DESCRIPTION OF THE INVENTION

Large conferences, typically including 10's of participants, will typically have many participants viewing the exact same image (current speaker plus the most recent 4 or 9 speakers) as opposed to small conferences, typically including up to 11 participants, where everybody will see a different image, e.g. current speaker in large view, plus the 9 other participants in live "thumbnail" views, also known as Picture-in-Picture (PIP). A participant will never see himself.

If there is packet loss present, there is a chance that some participants (especially if they are remote participants in a single location, such that they will see the same quality across the WAN) will have the same degree of packet loss or the same bandwidth constraints.

Hence it makes sense to group endpoints sharing the same bandwidth, packet loss, resolution, etc and use the same Virtual Endpoint (VE) to generate this particular stream. According to embodiments herein, a continuous monitoring of the packet loss characteristics of the connections between the VE and the real endpoints is provided, and may move an endpoint to a different VE at any time.

Figure 1:
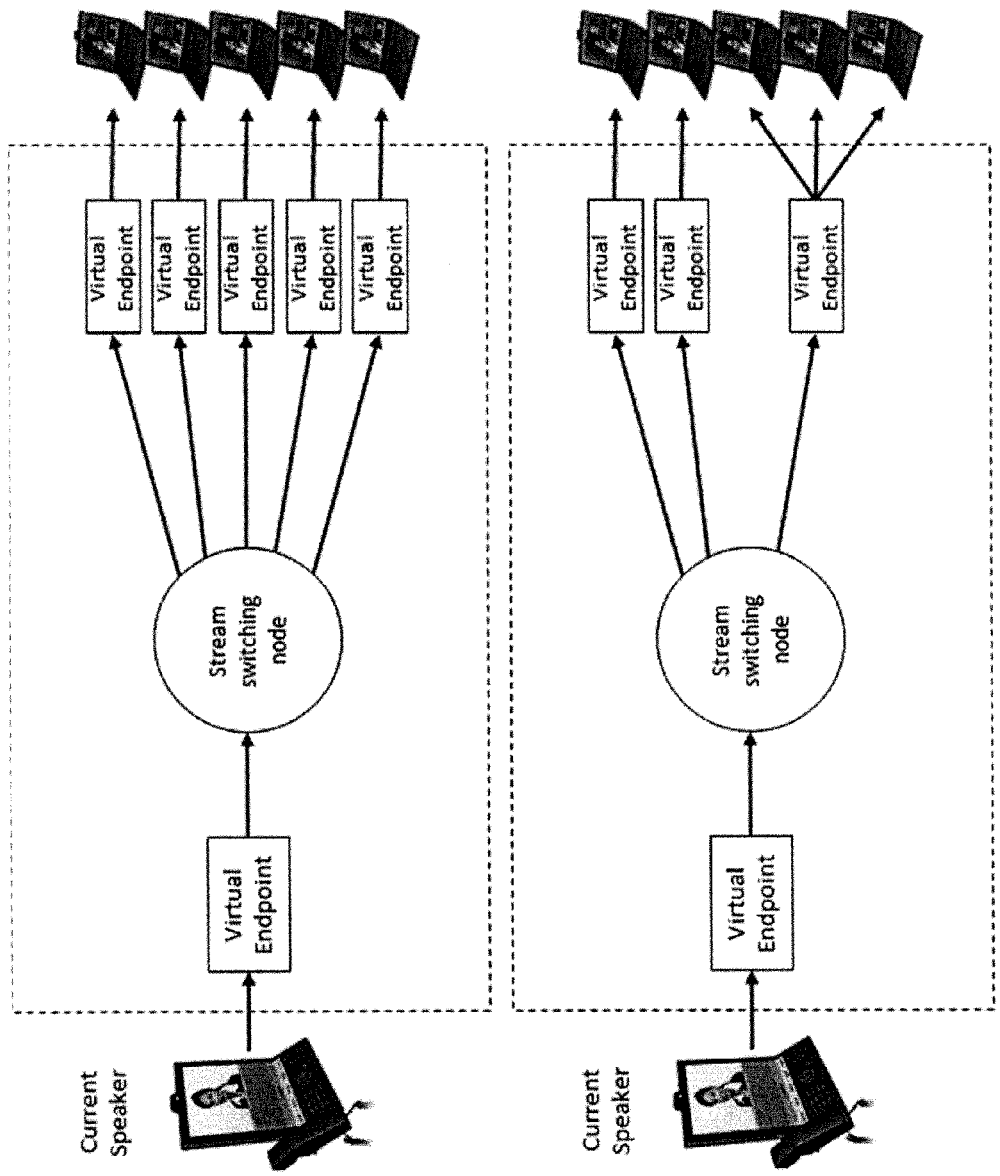
FIG. 1 shows an example of a structure of how video data from an endpoint of a current speaker might be processed and switched in a video conference involving virtual endpoints and stream switching nodes.

FIG. 1 shows a possible structure of how video data from an endpoint of a current speaker might be processed and switched in a video conference involving virtual endpoints and stream switching nodes. The components included in the MCU are enclosed in the dotted line. An endpoint comprises i.a. typically a decoder and an encoder, which encoder is encoding video data that is being transmitted to an MCU for further transcoding and switching. In some embodiments, Virtual Endpoints are implemented in the MCU, also comprising a decoder and an encoder for among others to release the respective endpoints from having to generate and transmit video data in different formats and resolution.

Note that the VE is the entity that composes the outgoing image, and does the encoding of the live image to e.g. the H.264 standard.

When video data from an endpoint has been processed by its dedicated virtual endpoint, it is forwarded to a switching node which is switching the processed video data to other virtual endpoints respectively serving the endpoints in the video conference subscribing video data from the endpoint of the current speaker or a former speaker. The upper part of FIG. 1 shows a situation of one dedicated virtual endpoint for each endpoint subscribing video data, while the lower part of FIG. 1 shows a situation where three of the endpoint subscribing the same video data are sharing the same virtual endpoint. Consequently, the subscribing endpoints are sharing encoders on the line-side between the MCU and the endpoints. Shared encoders on the line side is relevant for very large meetings (whether they are distributed or not), since it greatly increases the number of participants that can connect to a single switching node.

On the other hand, sharing encoders in the backplane is relevant for distributed deployments of an MCU. In a distributed MCU application, where multiple switching nodes reside in different locations, the media streams are transmitted between switching nodes over a logical entity called "the Backplane". As exemplified in FIG. 2, Location A, B, C and D and the Backplane belongs to a distributed MCU. This allows for optimizing resource usage in distributed conferences where multiple nodes are involved. The Transcode entities indicated at Location A comprises i.a. an encoder to encode video data from respective VEs at Location A switched by the location's Stream switching node to be forwarded through the Backplane to other locations subscribing video data from one or more of the endpoints associated with Location A. As indicated from the arrows crossing the Backplane, this also applies for the opposite direction.

Figure 2:
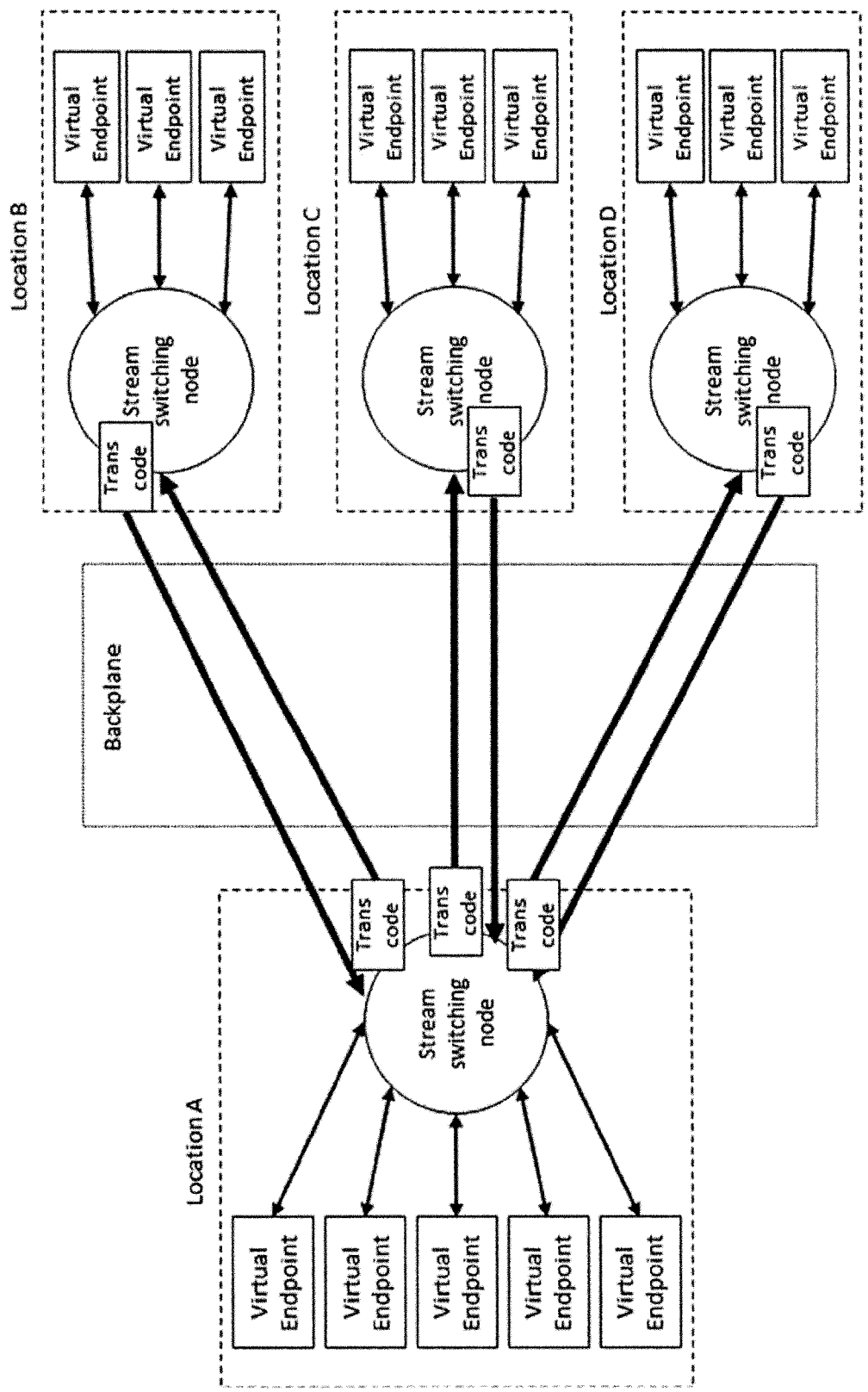
FIG. 2 is an example of a distributed video conference.

As an example, if the current speaker is in Location A, all the other participants in Locations A, B, C, and D should receive the transmitted video from the current speaker. The switching node in Location A will therefor send one stream to Location B, one stream to Location C and one stream to Location D. Each stream will be separately encoded in the Transcode entities in order to cope with packet loss and other network impairments across the backplane. Hence, FIG. 2 shows the naïve case with one transcoder per stream. This works and is robust, but is requires a lot of resources since transcoding a High Definition (HD) video stream is quite CPU intensive. In the case of low bandwidth or packet loss between Location A and Location B, the stream from A to B can be separately transcoded to a lower resolution format using less bandwidth (compared to the streams from A to C and A to D), hence making the system more robust.

However, it is possible to reduce the need for CPU resources by sharing of encoders.

Embodiments herein, teaches a general process starting with no encoders in the VE or Transcoder entity at all. Each stream across the backplane or the line-side is monitored for packet loss indicated by a Packet Loss Indication (PLI) and requests for new participants and new location of the distributed MCU. In the event of a request for a new participant or detection of a PLI within a time frame, an encoder is allocated for that stream. If other streams have similar packet loss issues, these streams are grouped together and will share a common encoder.

Figure 3:
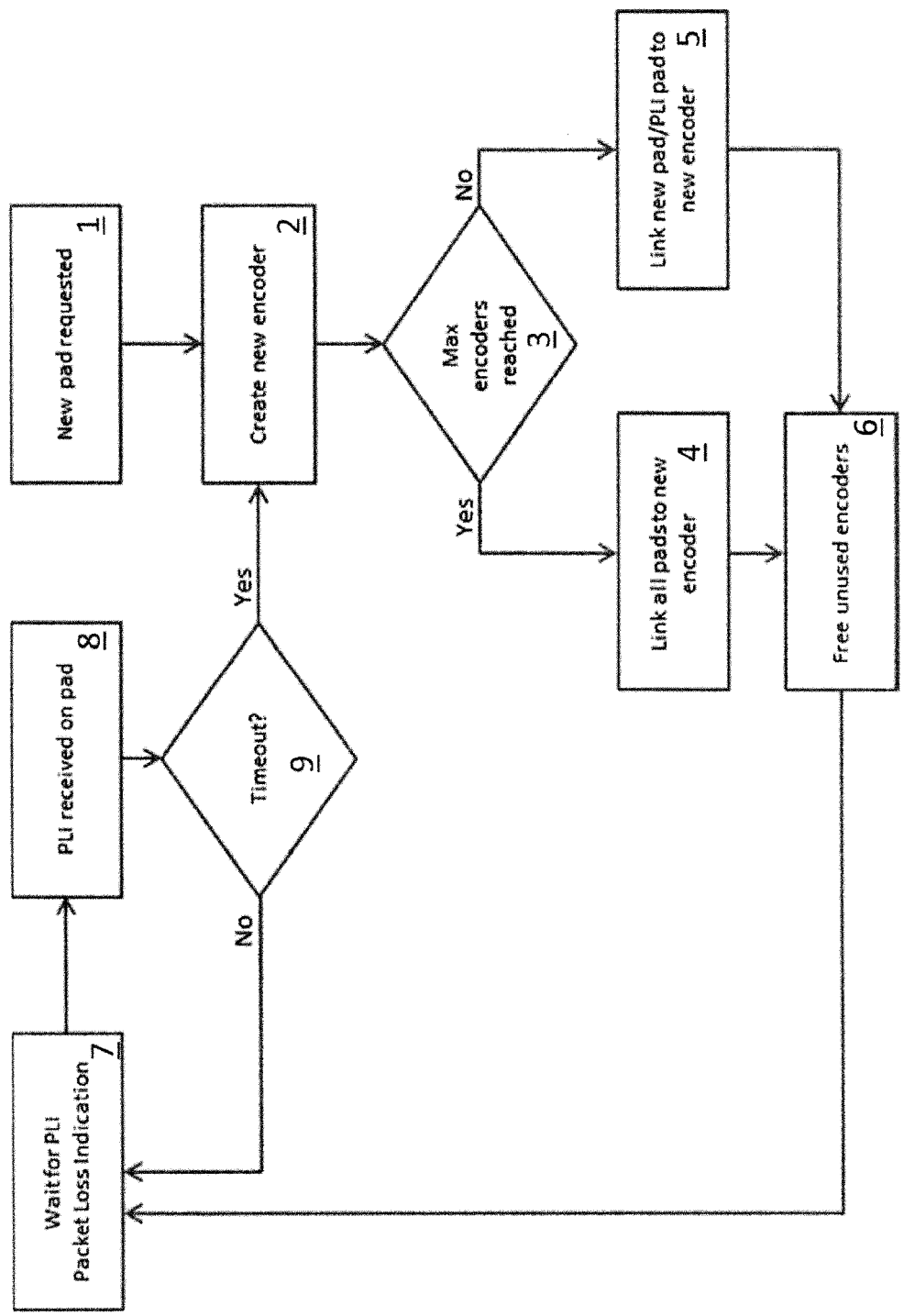
FIG. 3 is a flow chart illustrating an example embodiment.

FIG. 3 is a flow chart illustrating an example embodiment. A "pad" denotes a virtual entity within a Transcoding entity or a VE when encoder resources are shared. "New pad requested"—occurs when a new endpoint or a new location joins the call or when a PLI has been detected within a certain time frame. When a new pad is requested, a new encoder will be created in order to generate the stream to be sent out through the pad and to the real endpoint or to a different location through the backplane.

According to one embodiment, a pad is adjusted to monitor Packet Loss Indications (PLI) of the data packets received from the associated endpoint on the line-side or from an associated location on the backplane.

When an endpoint is subscribing video data, a new pad is requested in a VE 1. Similarly, when a location is subscribing video data from another location, a new pad is requested in a transcoder entity at this location.

In both cases, a step of creating a new encoder is executed 2. It is then investigated whether the maximum number of encoders is reached 3. The maximum number of encoders is the predefined allowed number of encoders which is not shared by a plurality of pads.

If the maximum number of encoders is reached, all existing pads in addition to the new created pad are linked to the newly created encoder 4, i.e all the pads will share the newly created encoder.

If the maximum number of encoders is not reached, only the new pad will be linked to the newly created encoder 5. Then, the now unused encoders are freed 6 and made available for subsequent creation of new encoders.

The process is then pending for a PLI 7, and when PLI is detected 8 within a predefined timeout period 9 since last PLI, the process then turns to the step of creating a new encoder 2, and is proceeding further according to the process from there as described above. If PLI is not detected within the predefined timeout period, the process is accordingly pending for a PLI in another predefined timeout period.

Figure 4:
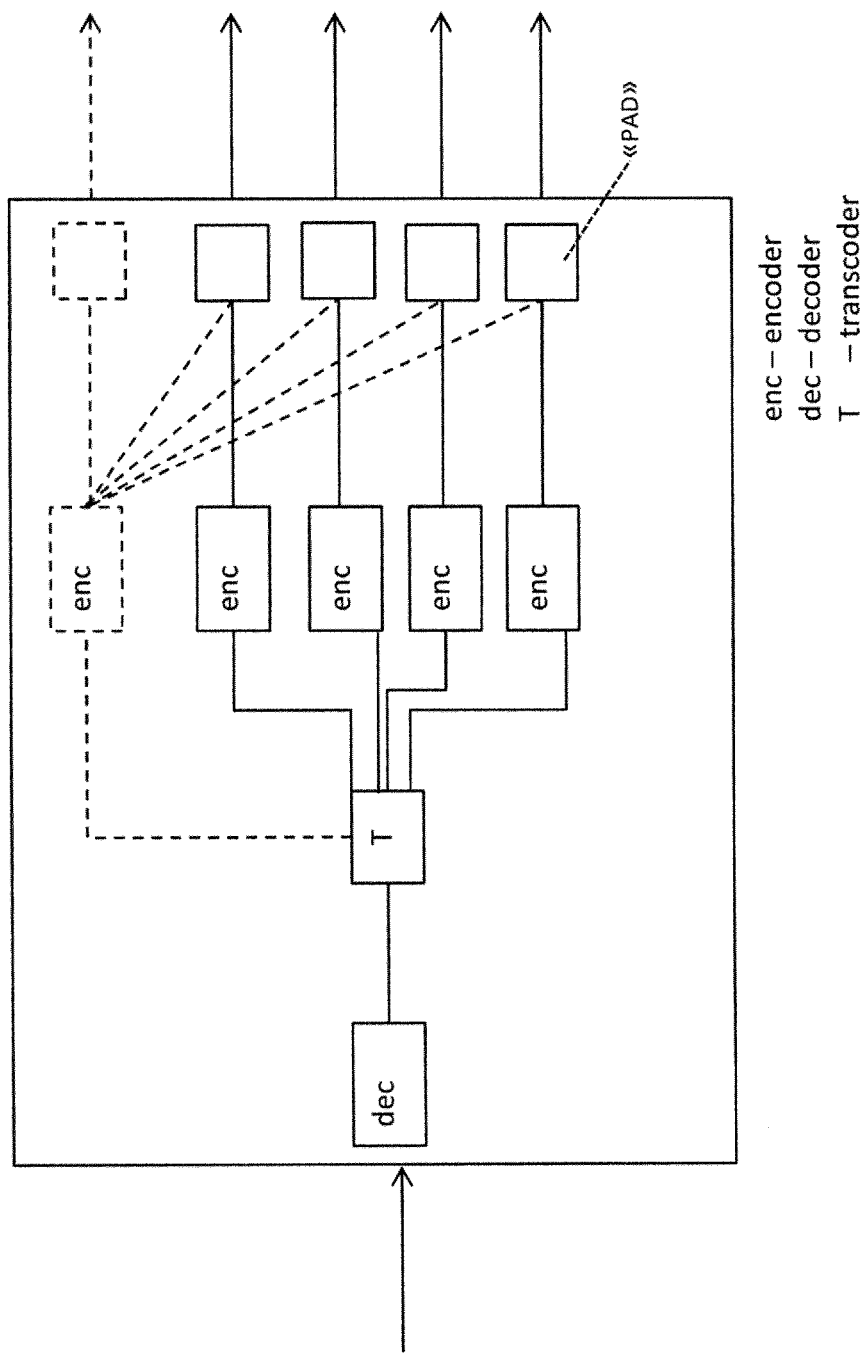
FIG. 4 is an illustration of a snapshot in a Virtual Endpoint or a Transcoder entity having four non-sharing encoders each linked to one pad shown in solid lines.

FIG. 4 is an illustration of a snapshot in a VE or a Transcoder entity having four non-sharing encoders each linked to one pad shown in solid lines. Here, the predefined maximum number of encoders is four. The dotted lines indicate what happens when a new encoder is introduced, either because of a new pad request or because a PLI within the predefined time period is detected. As can be seen, all existing pads in addition to the new created pad are linked to the newly created encoder. As a consequence, the other encoders are freed as available encoding resources for subsequent pad requests.

As streams are monitored for packet loss and bandwidth characteristics they can be moved from one shared encoder to another shared encoder. Best case, a stream can stop using a transcoder altogether.

The embodiments as described above have shown that hundreds of endpoints can be served by tens of VEs, resulting in significant savings in CPU usage.

The embodiments herein are not limited to the above described examples. Various alternatives, modifications and 15 equivalents may be used.

What is claimed is:

1. A method for dynamic allocation of encoders in a multiparty video conference of video conference endpoints, the video conference endpoints are configured to encode and transmit a media stream comprising at least video data, the method comprising:
   requesting for a new pad;
   creating a new encoder in response to said request for the new pad;
   determining whether a maximum number of encoders is reached;
   if the maximum number of encoders is not reached, linking the new pad to the new encoder;
   if the maximum number of encoders is reached, linking all existing pads to the new encoder; and
   releasing all unused encoders.

2. The method of claim 1, further comprising:
   monitoring for Packet Loss Indications (PLI); and
   if a PLI is received within a predefined time period since a last received PLI, requesting for a new pad.

3. The method of claim 2, further comprising requesting for a new pad when a new endpoint is entering the video conference.

4. The method of claim 2, wherein a pad is a virtual entity within a transcoding entity on a backplane between switching nodes.

5. The method of claim 2, wherein a pad is a virtual entity within a Virtual Endpoint (VE) sharing encoder resources on a Multipoint Control Unit (MCU) between a number endpoints.

6. The method of claim 1, further comprising:
   requesting for a new pad when a new endpoint is entering the video conference.

7. The method of claim 6, wherein a pad is a virtual entity within a transcoding entity on a backplane between switching nodes.

8. A method of claim 6, wherein a pad is a virtual entity within a Virtual Endpoint (VE) sharing encoder resources on a Multipoint Control Unit (MCU) between a number endpoints.

9. The method of claim 1, wherein a pad is a virtual entity within a transcoding entity on a backplane between switching nodes.

10. The method of claim 1, wherein a pad is a virtual entity within a Virtual Endpoint (VE) sharing encoder resources on a Multipoint Control Unit (MCU) between a number of endpoints.

11. A system providing dynamic allocation of encoders in a multi-party video conference of video conference endpoints, the video conference endpoints are configured to encode and transmit a media stream comprising at least video data, the system being configured to:
    request for a new pad;
    create a new encoder in response to said request for the new pad;
    determine whether a maximum number of encoders is reached;
    if the maximum number of encoders is not reached, link the new pad to the new encoder;
    if the maximum number of encoders is reached, link all existing pads to the new encoder; and
    release all unused encoders.

12. The system of claim 11, wherein a pad is a virtual entity within a transcoding entity on a backplane between switching nodes.

13. The system of claim 11, wherein a pad is a virtual entity within a Virtual Endpoint (VE) sharing encoder resources on a Multipoint Control Unit (MCU) between a number endpoints.

14. A computer program product for dynamic allocation of encoders in a multi-party video conference of video conference endpoints, the video conference endpoints are configured to encode and transmit a media stream comprising at least video data, the computer program product comprising a non-transitory computer-readable storage medium having computer-readable program code embodied in said medium, said computer-readable program code comprising computer readable program code configured to:
    request for a new pad;
    create a new encoder in response to said request for the new pad;
    determine whether a maximum number of encoders is reached;
    if the maximum number of encoders is not reached, link the new pad to the new encoder;
    if the maximum number of encoders is reached, link all existing pads to the new encoder; and
    release all unused encoders.

* * * * *